United States Patent Office 3,290,931
Patented Dec. 13, 1966

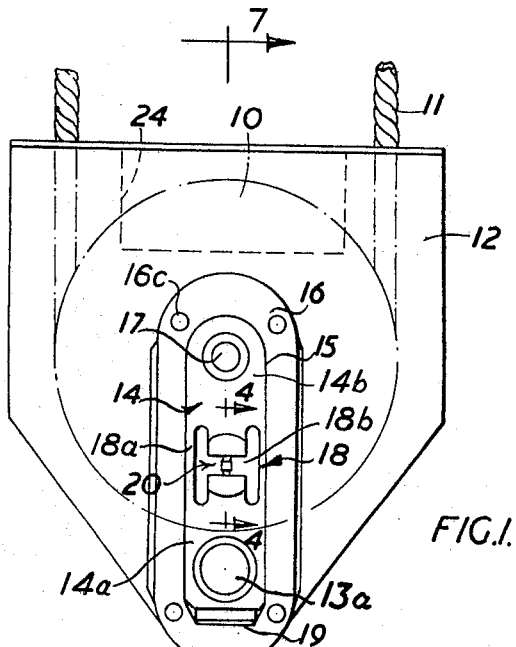
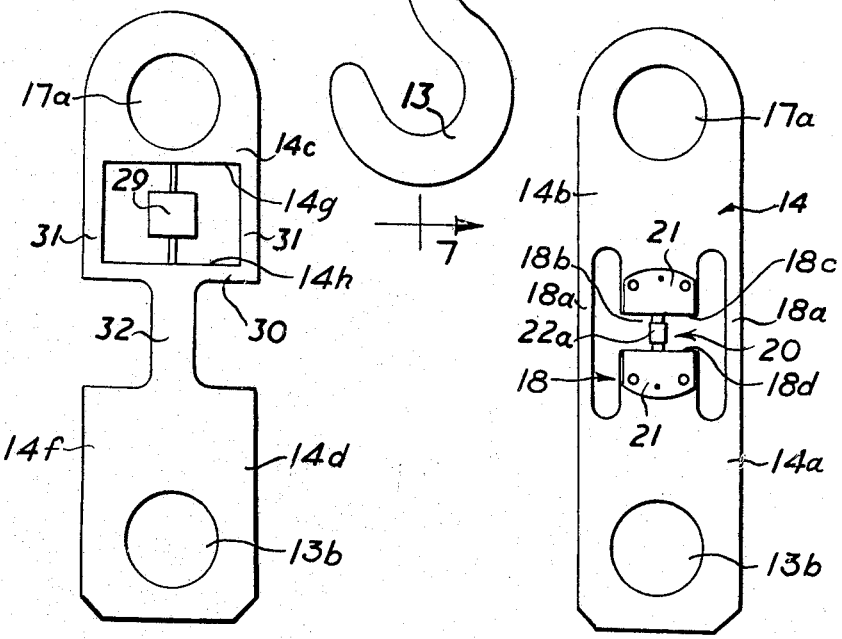
FIG.1.
FIG.3.   FIG.2.

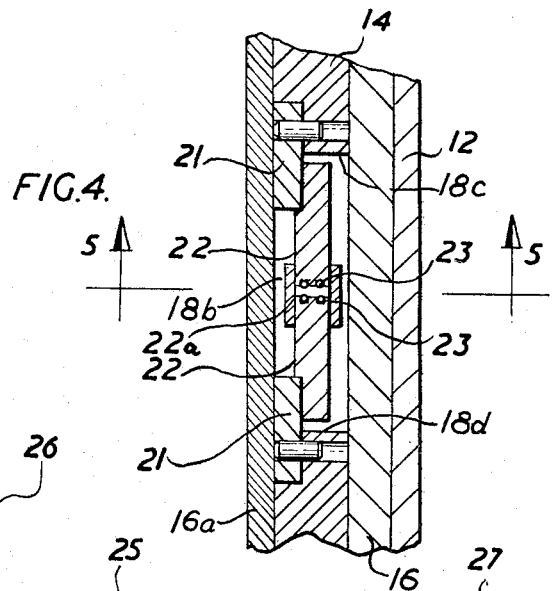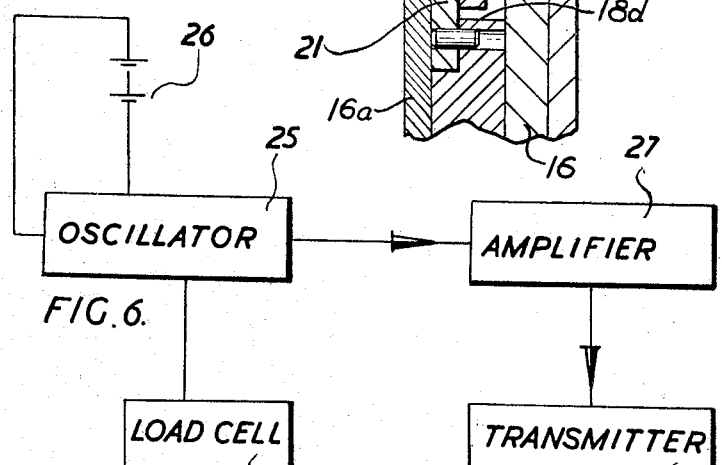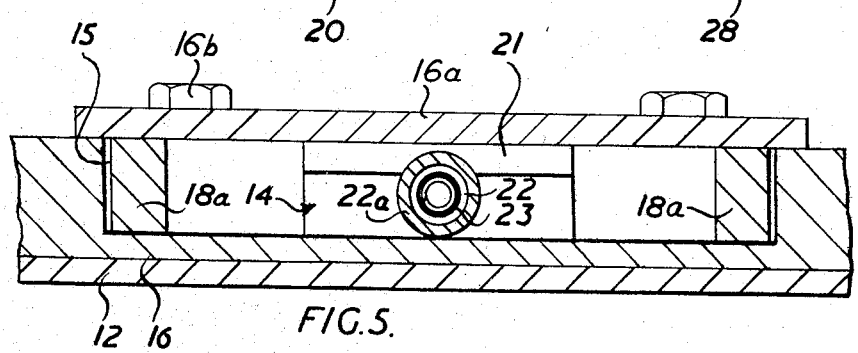

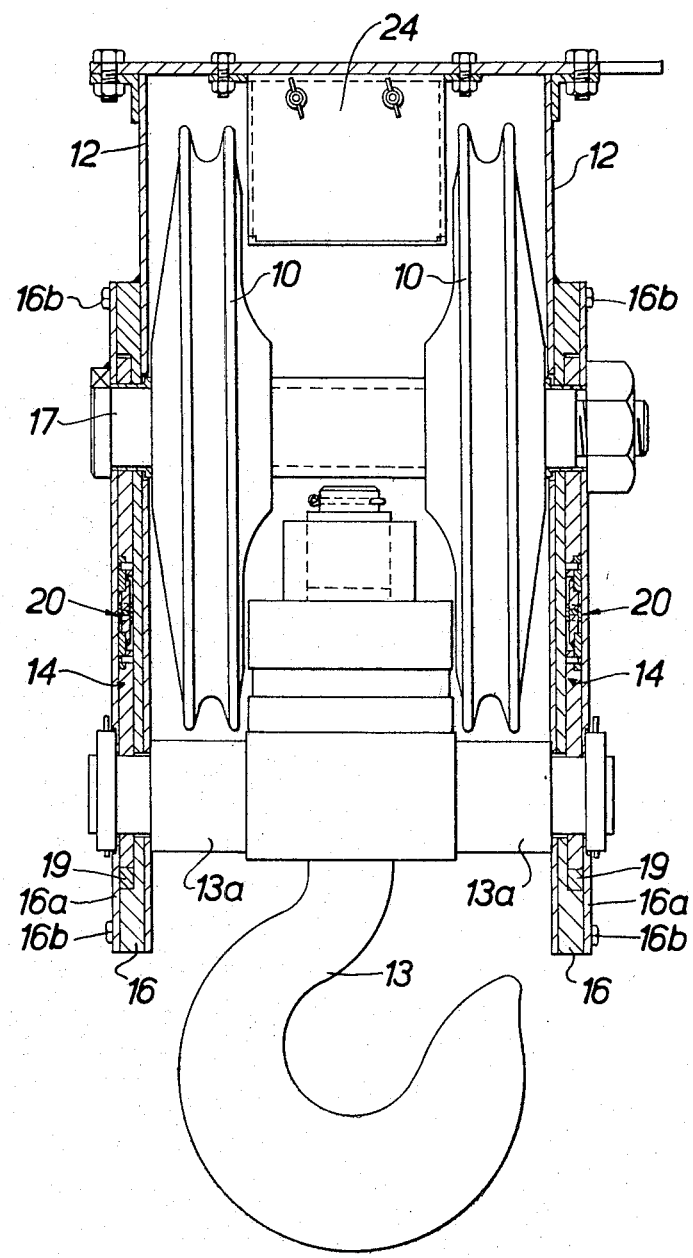

3,290,931
WEIGHT SENSING CRANE HOOK
Ronald Fowkes, Solihull, Campbell Dean Boadle, Caerleon, and David Warwick Lloyd Clamp, Cwmbran, England, assignors to Girling Limited, Birmingham, England, a British company
Filed Oct. 30, 1963, Ser. No. 320,119
Claims priority, application Great Britain, Oct. 31, 1962, 41,123/62
13 Claims. (Cl. 73—141)

This invention relates to cranes, and in particular to a method of embodying a weight sensitive device in the falling block of a crane.

Installations are known in which a load cell is disposed in conjunction with the hook member between the sheaves of the falling block, the output signal from the load cell being transmitted to the crane cab through a cable which of necessity must have considerable slack to allow for variations in the positions of the falling block. This system suffers from the disadvantage that the cable may be easily damaged and the load cell and other parts inside the falling block are not readily accessible for maintenance or replacement.

According to the invention, in a falling block for a crane, there are disposed load sensitive means adapted to respond to the elastic strain under load of a weight carrying member of the falling block, and means associated with said sensing means adapted to transmit a signal corresponding to said strain.

According to a feature of the invention, each weight carrying member and the load sensing means are conveniently disposed in at least one of the side plates of the falling block and are readily accessible for servicing or replacement.

Where the crane is of a large capacity and handles heavy loads the load sensitive means will preferably be arranged to measure the extension or compression under load of a weight carrying member in the falling block and issue a signal which corresponds to this extension or compression and hence to the load carried by the crane. The signal is preferably amplified and transmitted at a radio frequency from a transmitter carried on the falling block to be received and interpreted at a remote point. This avoids the need to have the falling block connected to a fixed part of the crane by an electric cable.

Where it is desirable to assess the loads carried by a crane handling light articles a more sensitive method may be employed: for example the load sensitive means can be arranged to measure the deflection of a centrally loaded beam employed in the falling block as a load-carrying member.

The load sensitive device may comprise a load cell of the inductance or capacitance type in either case producing a frequency variation of a standard signal. The modulated standard signal is amplified and transmitted at a radio frequency from the falling block to be picked up by a radio receiver at a remote point. The standard carrier signal is produced by an oscillator circuit carried in the falling block and the load cell may be arranged to modulate the carried signal in either frequency or amplitude.

By way of example, one embodiment of the invention will now be described with reference to the accompanying drawings in which:

FIGURE 1 is an elevation, with parts removed, of a falling block for a crane including load sensing means according to the invention;

FIGURE 2 is a view to a larger scale of a part shown in FIGURE 1;

FIGURE 3 is a view of an alternative form of the part shown in FIGURE 2;

FIGURE 4 is a fragmentary sectional view to a larger scale taken generally on the line 4—4 in FIGURE 1;

FIGURE 5 is a fragmentary sectional view taken on the line 5—5 of FIGURE 4;

FIGURE 6 is a schematic diagram showing the layout of the electric circuit associated with the load sensing means; and FIGURE 7 is an enlarged vertical cross-sectional view taken on the line 7—7 of FIGURE 1.

A falling block for a crane as shown in the drawings comprises a pair of sheaves 10 running on a cable 11 and rotatably mounted between slide plates 12, having an articulated load-carrying hook 13 pivotally mounted on a pin 13a. The load on the hook is supported from the sheaves by way of a pair of hardened steel weight-carrying tension members 14 received each in a recess 15 in a plate 16 secured to the side plates. The recess 15 is desirably covered by a plate 16a as shown in FIGURE 5 which is held in place by bolts 16b received in the openings 16c shown in FIGURE 1. As is shown in an opening 13b in FIGURES 1 and 2 each end part 14a of the pin 13a supporting the crane hook is journalled in the lower end of each tension member 14, the upper end part 14b of each tension member being carried on the spindle 17 of the sheaves by way of opening 17a. Each tension member, shown in more detail in FIGURE 2, is generally elongated in shape the central portion being cut away in the form of an H shaped opening 18 to leave a pair of horizontally spaced straps 18a which bear the load and are extensible within their elastic limit under the maximum load for the crane.

The side straps 18a extend in proportion to the load carried by the hook and to prevent these straps being strained beyond the elastic limit should the crane be overloaded load limiting means are provided comprising a bottoming plate 19 secured to each plate 16 in the lower end of the recess 15. The bottoming plate 19 is so disposed that when each tension member is overloaded it will abut the bottoming plate and relieve the side straps of any further loading, before they are strained beyond the elastic limit.

Between the side straps 18a each tension member 14 is formed with a horizontal air gap 18b having vertically spaced upper and lower edges 18c, 18d whose spacing varies with the extension of the side straps. Across this air gap are arranged load sensitive means generally indicated at 20 in FIGURES 1 and 2 and shown in more detail in FIGURES 4 and 5. The load sensing means comprises a mounting plate 21 secured to each edge of the gap and secured to each plate is a ferrite pot core 22 so that the load sensing means is in the form of a pair of T-shaped members arranged with their vertical limbs co-axial and facing each other, their ends being separated by a small air gap. The width of this gap varies with the extension of the side straps from .003" at no load to .006" at full load, the pot cores being enclosed by a short cylindrical sleeve 22a to exclude dust. The change in this air gap under load is conveniently measured by change in inductance but may be measured by change in capacitance. In the change in inductance method the ends of each pot core is provided with a coil 23 which is located in a circular groove and is connected in a relaxation oscillator circuit 25 (see FIGURE 6), the arrangement of the circuit being such that the frequency of oscillation is determined by the inductance of the coil and therefore by the air gap width which is proportional to the load.

The load sensing means described is connected to the oscillator circuit 25 powered by a battery 26 (see FIGURE 6) and the signal from the oscillator circuit is fed to an amplifier 27 and thence to a radio frequency transmitter 28 housed in a bore 24 between the sheaves. The signal from the load sensing means is impressed upon a signal of standard carrier frequency which is sent out by the transmitter, the falling block being provided with an aerial (not shown) for this purpose. The output signal of the transmitter can be distinguished by a remote receiver and suitable interpretation of the slight variation of the frequency of the carrier signal due to the impressed signal gives a reading of the load on the hook.

Where a number of cranes employing frequency modulated load sensing means of the type described are to be used in the same vicinity each crane will be allocated a characteristic carrier frequency so that its signal can be distinguished from the signals of the other cranes by the remote receiver.

In applications where the loads carried by the crane are comparatively light the arrangement described might not be sufficiently accurate. In such cases the weight-carrying member 14 shown in FIGURE 2 could be replaced by a weight-carrying member 14d having upper and lower parts 14c, 14f as shown in FIG. 3 and which is similar to the member 14 shown in FIG. 2 except that the load sensing means 29 is arranged to measure the strain or deflection of a laterally extending beam 30 whose opposed ends are connected by two straps 31 to the upper part 14c of the member 14d. The beam 30 is centrally connected to and loaded from the lower part 14f of the member 14d by a third strap 32. The upper part 14c of the member 14d has a lower edge part 14g which is vertically spaced from the upper side 14h of the beam 30 to define a gap for the load sensing means 29 which may be arranged similarly to the member 20 shown in FIG. 2. For a given load the weight-carrying member of FIG. 3 will produce a greater extension than the one shown in FIGURE 2. The load sensing means 29 may be of the capacitance type in which case the deflection of the beam 30 causes a change in the capacitance of an air gap and produces an output signal which can be used to modulate the frequency of the transmitter output as before.

The invention is applicable to all types of cranes but is particularly helpful in obtaining weight and stock control during processing in a plant such as a steel mill where materials are generally only weighed when entering and leaving.

We claim:

1. A falling block for a crane comprising a sheave running on a hoisting cable, a pair of side plates, a crane hook supported from the sheave between said side plates, weight-carrying members housed in recesses in said plates and forming load bearing connections between said sheave and said crane hook, load-limiting means carried by said side plates and operative to prevent overloading of said weight-carrying members, load sensing means in each weight-carrying member carried in a gap adjacent a portion of reduced cross-section, the load sensing means being capable of measuring the load supported as a function of the elastic deformation under load of said portions of the weight-carrying members, a radio-frequency transmitter mounted in the falling block and coupled to said load sensing means for transmitting a radio signal corresponding to the load supported.

2. A falling block according to claim 1 wherein said load-limiting means comprise abutment plates mounted in said recesses in positions relative to the weight-carrying members such that after a given deformation of said weight-carrying members under load they engage and are relieved of further loading by said abutment plates.

3. A falling block according to claim 2 wherein each load sensing means is of the inductance type and comprises two parts mounted on the weight-carrying member at opposite sides of said gap and spaced apart in the direction of loading, the load sensing means being capable of measuring the load supported as an inductance change on deformation of said portions of the weight-carrying members under load.

4. A falling block according to claim 2 wherein each load sensing means comprises two parts of a capacitor mounted in the weight-carrying member on opposite sides of said gap and spaced apart in the direction of loading, the load sensing means being capable of measuring the load supported as a capacitance change on deformation of said portions of the weight-carrying members under load.

5. A falling block for a crane comprising a pair of spaced side plates, two weight-carrying members respectively housed in recesses in said side plates, each of said members having upper and lower parts, at least one of said members having an opening therein defining a pair of horizontally spaced straps integrally connecting said upper and lower parts of said weight-carrying member, said opening having vertically spaced upper and lower edges defining between them a gap, a cable-receiving sheave disposed between the side plates and rotatably supported by the upper ends of each weight-carrying member, a load supporting member carried by the lower ends of the weight-carrying members, a load-sensing in said gap and having first and second parts respectively carried by the upper and lower edges of said gap, said load-sensing means being operative to measure the load supported as a function of elastic deformation under load of said pair of straps.

6. A falling block according to claim 5 wherein said load-sensing means is of the inductance type and capable of measuring the load supported as an inductance change on deformation under load of said pair of straps.

7. A falling block according to claim 5 wherein said load-sensing means comprises two parts of a capacitor mounted on the opposite edges of said gap, the load-sensing means being capable of measuring the load supported as a capacitance change on deformation of said pair of straps under load.

8. A falling block according to claim 5 including a radio-frequency transmitter mounted between said side plates and coupled to said load-sensing means, the transmitter being capable of transmitting a radio signal corresponding to the load supported.

9. A falling block for a crane comprising a pair of spaced side plates, two weight-carrying members each housed in a recess in a side plate, each weight-carrying member having upper and lower parts, a laterally extending beam carried centrally by the lower part of at least one of said members, means integrally connecting the upper part with opposed end parts of said beam, the upper part having a lower edge part vertically spaced from the upper side of said beam to define a gap, a cable receiving sheave disposed between the side plates and rotatably supported by the upper part of each weight-carrying member, a load-supporting member carried by the lower end of each weight-carrying member, load-sensing means mounted in said gap and having first and second parts respectively carried by the lower edge part of the upper part of said member and the upper side of said beam, said load-sensing means being operative to measure the load supported as a function of the deflection under load of said beam but without sustaining any of the load carried by said load carrying member.

10. A falling block according to claim 9 wherein the load-sensing means is of the inductance type and capable of measuring the load supported as an inductance change on deflection of said beam-loaded portion under load.

11. A falling block according to claim 9 wherein each load-sensing means comprises two parts of a capacitor mounted on a weight-carrying member on opposite sides of said gap, the load-sensing means being capable of measuring the load supported as a capacitance change on deflection of said beam loaded portion under load.

12. A falling block according to claim 9 including a radio frequency transmitter mounted on said falling block and coupled to said load-sensing means, said transmitter being capable of transmitting a radio signal corresponding to the load supported.

13. A falling block according to claim 12 including a bottoming plate carried in each side plate adjacent a corresponding surface of said weight-carrying member and capable, on a given deformation of said weight-carrying member, of providing an abutment engaging and supporting said weight-carrying member to prevent further deformation thereof under load.

References Cited by the Examiner

UNITED STATES PATENTS

| | | | |
|---|---|---|---|
| 2,555,355 | 6/1951 | Macgeorge | 73—88.5 |
| 2,667,626 | 1/1954 | Blancher | 73—141 X |
| 2,756,411 | 7/1956 | Turnage | 73—88.5 X |
| 2,820,624 | 1/1958 | Koegel | 73—141 X |
| 3,081,625 | 3/1963 | Fryer et al. | 73—141 |
| 3,095,057 | 6/1963 | Kraeling | 177—147 |

FOREIGN PATENTS 865,822  2/1953  Germany.

RICHARD C. QUEISSER, *Primary Examiner.*

CHARLES A. RUEHL, *Assistant Examiner.*